United States Patent [19]

Cox

[11] Patent Number: 4,656,620

[45] Date of Patent: Apr. 7, 1987

[54] APPARATUS FOR OBTAINING REDUCED PIN COUNT PACKAGING AND METHODS

[75] Inventor: John E. Cox, Stamford, Conn.

[73] Assignee: ITT Corporation, New York, N.Y.

[21] Appl. No.: 652,371

[22] Filed: Sep. 19, 1984

[51] Int. Cl.$^4$ ............................................. H04Q 11/04
[52] U.S. Cl. ....................................... 370/58; 370/68; 370/63
[58] Field of Search ........................ 370/63, 58, 68, 77, 370/94, 86, 79, 97, 118, 119, 104

[56] References Cited

U.S. PATENT DOCUMENTS

| | | | |
|---|---|---|---|
| 4,179,587 | 12/1979 | Herchtal | 370/58 |
| 4,292,623 | 9/1981 | Eswaran et al. | 370/94 |
| 4,335,456 | 6/1982 | Gaiser et al. | 370/58 |
| 4,412,322 | 10/1983 | Briley et al. | 370/58 |

Primary Examiner—Douglas W. Olms
Assistant Examiner—Curtis Kuntz
Attorney, Agent, or Firm—Peter C. Van Der Sluys

[57] ABSTRACT

In order to reduce hardware cost, apparatus is disclosed for reducing the pin count or terminal count of circuit modules in a large digital system, resulting in condensed packaging and the elimination of huge connecting structures and backplane orientations in such systems. The apparatus depicted employs a time division bus to serially carry data from a plurality of terminal locations and to demultiplex the serial data by means of a demultiplexer to provide a plurality of output logic states on a plurality of parallel data lines. These data lines are directed to a logic array circuit which can perform predetermined logic operations on the data prior to transmission of the same to associated backplanes in the system. The outputs from the logic array circuit are multiplexed to provide a time division serial output bus for transmission to the back planes or shelves of other modules in the system. The entire apparatus as the demultiplexer, the logic array and the multiplexer are preferably contained on the same VLSI chip card or board resulting in a substantial reduction in terminals or pins required for transmission to other system modules.

14 Claims, 3 Drawing Figures

APPARATUS FOR OBTAINING REDUCED PIN COUNT PACKAGING AND METHODS

BACKGROUND OF THE INVENTION

This invention relates to apparatus for reducing pin or terminal count in packaging and particularly to a circuit structure capable of being integrated on a single chip or located on a single board which structure eliminates the necessity for physically wiring or connecting great numbers of terminals together.

Modern technology, due to the use of the integrated circuits as well as the microprocessor and improved logic techniques, has enabled the construction and operation of large and improved systems. A major example of such a system is the modern digital communication system. Such systems are capable of sophisticated operation and afford the servicing of thousands and thousands of subscribers. Such systems will rapidly increase in size and sophistication as the systems continue to service a greater number of subscribers. An example of such a system is the ITT 1240 Digital Exchange. This system is employed in many countries throughout the world and is an example of a modern digital telecommunications network.

The system has been described in the patent literature as well as in various publications. See for example a publication entitled *Electrical Communication*, Vol. 56, Number 2/3, 1981. In that issue there appears a number of articles describing the 1240 system as manifested and offered for sale by the International Telephone and Telegraph Corporation, the assignee herein. In particular, reference is made to the article entitled ITT 1240 Digital Exchange Advanced Component Technology, by J. Cornu et al on page 161 to page 172, ITT 1240 Digital Exchange-Digital Switching Network by J. M. Cotton et al on pages 148 to 160 and ITT 1240 Digital Exchange-Hardware Description by S. Das et al on pages 135 to 147. As indicated, there are a number of patents which also describe the system and the technology.

In order to keep such systems competitive in price, the designers must consider the best tradeoff between customed designed hardware and custom designed software. For example, in the 1240 system or similar types of communications systems, a custom designed line circuit assembly is a major part of the factory cost of the finished product.

As is known, each subscriber to the system requires a line circuit, and hence if there are 100,000 subscribers, 100,000 line circuits are necessary. It is not yet possible to purchase such a line circuit assembly as a standard card from outside vendors as the system manufacturer requires correct interfaces of the circuit with the rest of the system as well as controlled modes of operation and signalling. Apart from such considerations is the fact that in order to obtain a custom circuit in the form of a custom chip, one must expend a great deal of time and effort and funds. Thus at the present state of technology, to obtain an essentially "bug free" custom chip, one can expect to spend three or more years in development. The long time implies high cost which may be marginally justified only with large quantities. As a partial answer to this problem, the industry has turned to ULA's (Uncommitted Large Arrays) and similar devices. Such devices permit a semi-custom application by employing external wire straps or printed card connections between the pads or terminals on the devices. Thus such devices may contain gates, counters and other logic devices which can be custom wired by the use of the pads on the device and hence be employed for various applications. Presently, there exists a range of devices with increasing numbers of gates and pads. In 1982 a ULA cost of ten dollars was average for a device with 70 to 80 pads or terminals and 1500 gate circuits.

The cost of the multipin or multi terminal package was dominant in the cost of the device. It is also apparent that with time this effect will become more pronounced so that the cost of the ULA device will become asymptotic to the cost of the package realizing that the cost of the circuit chip as a silicon chip will become lower and lower. Furthermore, the complexity imposed on the printed card package with all the external pad connections is difficult to quantify. It makes the layout and card testing more difficult and thus takes quantum jumps in cost, as it forces the designer into multi-layer printed circuit boards and other complicated structures.

It is thus apparent that except where large quantities and long lead times permit complex random logic custom chips to be used, the custom designs are approaching the sum of the costs of the non-silicon or non-circuit part of the equipment. That is, the device package cost, plus the printed card, connector backplates, terminals, enclosures and so on are becoming more and more costly. Apart from this is the large amount of time required to wire such devices into a system due to the increase in pads and terminals. Therefore, it follows that a major reduction in hardware cost will not come from the increased use of the silicon chip in such products as opposed to a simplification of packaging technology. Also, while it might be attractive to consider more semiconductor hardware for routine functions to offset the software development, this trend will be inhibited or encouraged depending on the impact on hardware product cost.

A similar problem once existed in telephone switching systems or exchanges which used space division switching. As technology advanced, there was a limit that circuit structure and cross point cost reduction would achieve and the cost of the actual physical equipment in the switch matrix was approaching the cost of the wiring, back planes, connectors and racks. Thus in the space division system as the system grew and more subscribers were accommodated, the cost of wiring and so on exceeded the cost of the actual circuitry. The solution to this problem was to move into the time domain and provided connectivity by time division switching.

Thus in present modern digital systems, the cost of wiring the integrated circuits and of wiring the backplanes is also exceeding the cost of the components while further requiring longer testing times and in general increasingly higher costs for such systems.

It is, therefore, an object of the present invention to provide apparatus for reducing the amount of wiring and packaging required in digital systems.

It is a further object of this invention to provide apparatus and a method for using a time division bus or busses to connect terminals together and to further provide logic processing of selected data on such terminals and then to employ an output bus to direct such terminal data to system locations.

A main object is to provide a structure which can be employed on a single card and which by means of a few terminals can accommodate a great number of terminal and pin connections to substantially reduce wiring, backplane construction and packaging limitations inherent in modern day digital systems.

BRIEF DESCRIPTION OF THE PREFERRED EMBODIMENT

Apparatus for reducing the pin count or terminal count associated with digital data generated in a digital system to enable said data to be distributed throughout said system to various modules requiring said data, comprising an input time division data bus having said data impressed thereon in the form of serial digital data signals, demultiplexing means having an input responsive to said serial data signal for providing at an output a plurality of data outputs each one indicative of one of said serial digital data signals, logic means having a plurality of inputs each one associated with one of said plurality of data outputs for performing logic operations on said data to provide a plurality of outputs manifesting processed data for transmission to said various modules of said system, multiplexing means having a plurality of inputs each adapted to receive one associated output of said logic means to provide at an output serial digital data signals having said processed data impressed thereon, whereby said digital data as provided by said system can be transferred between modules by said output serial digital data signals.

DETAILED DESCRIPTION OF THE FIGURES

Figure 1:
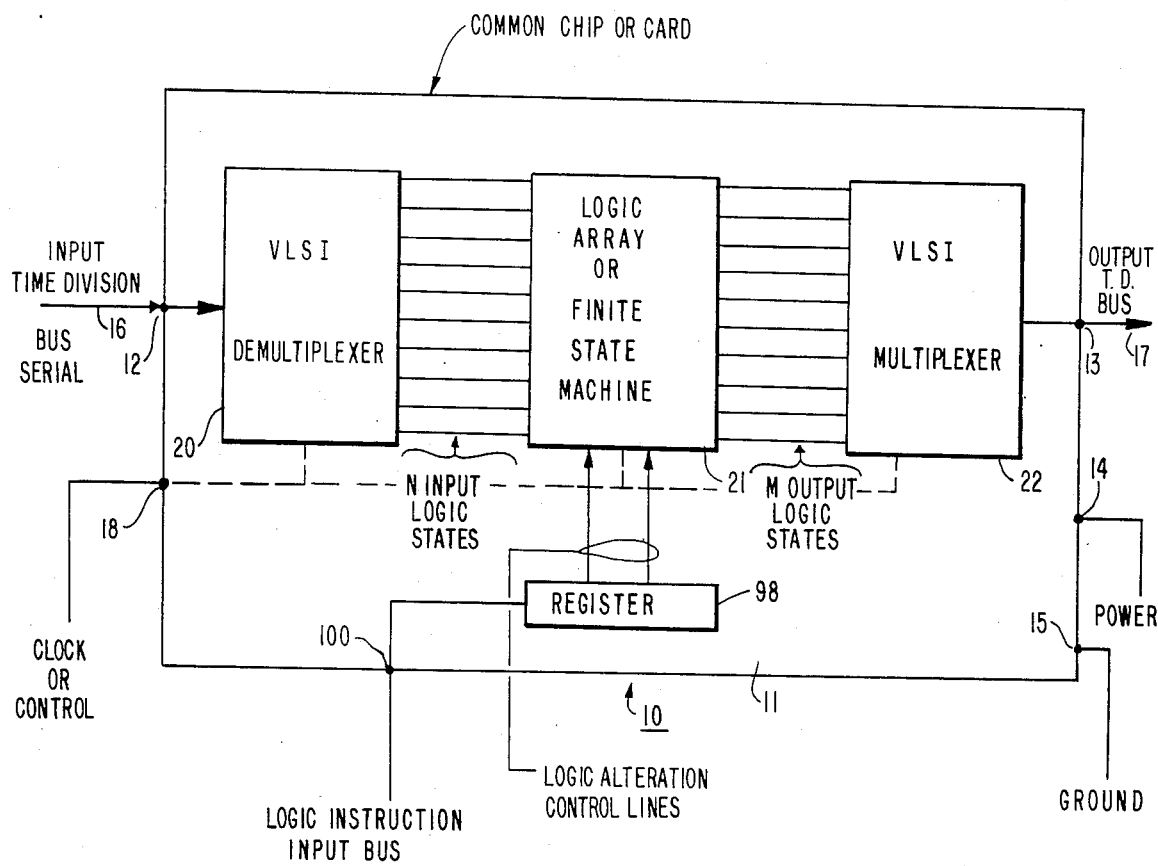
FIG. 1 is a simplified block diagram of apparatus for reducing terminal count which apparatus includes a dedicated logic array.

Referring to FIG. 1, there is shown a device, 10 for reducing pin or terminal counts according to this invention.

The device 10 is preferably fabricated on a single integrated circuit chip 11. The chip 11 includes at least four basic input pads or terminals as 12, 13, 14, and 15. Terminal 12 is designated as an input terminal and receives a serial digital data input from a time division bus 16. Terminal 13 is an output terminal for coupling to an output time division bus 17. There is terminal 14 adapted to be connected to a reference potential such as ground. There may be included another terminal or pad 18 for connecting each of the circuits located on the chip 11, to a clock or control signal for providing synchronization and control of the circuits on the chip.

Located on the chip 11 is a first circuit 20 designated as a VSLI demultiplexer. Essentially, demultiplexer 20 is a well known circuit component and such devices can be fabricated using very large scale integrated circuit techniques (VSLI) and integrated circuit techniques in general. The demultiplexer 20 essentially receives the input from the time division bus 16 which carries digital data in serial form. The time division bus 16 is also well known as will be further explained. The demultiplexer 20 responds to the data on the serial time division bus 16 to separate the data into a plurality of output channels or N input logic states at the output terminals.

See for example a text entitled *Telecommunication System Engineering* by R. L. Freeman, (1980) John Wiley and Sons, Inc. This text gives many examples of suitable demultiplexer and multiplexer configurations. As seen in the figure, the N outputs from the demultiplexer 20 are applied as N inputs to a logic array or finite state machine 21. Preferably, circuit 21 is fabricated on the same chip as the demultiplexer 20 and contains logic circuits which can serve to further process the data bits on each of the N input lines. The logic array 21 can be a microprocessor circuit which may be programmed or other structure to operate on the logic states of the N input lines emanating from the demultiplexer 20. The logic array 21 may consist of a plurality of gates or buffer amplifiers where each of the N inputs may be gated or delayed for synchronization purposes or each signal may be converted as to a level change for logic and interface consideration or may be amplified and shaped prior to applying the data as M logic output states at the M outputs of the logic array 21. It is, of course, understood that the logic array 21, depending upon the circuitry included, may process the N input logic states from the demultiplexer 20 to M logic states at the output where M may be the same number as N or greater or smaller, depending upon the application or depending upon the data transmitted on the input time division bus 16.

The M outputs or M logic states emanating from the logic array 21 are directed to the M inputs of a multiplexer 22 preferably and fabricated on the same chip 11. The function of the multiplexer 22 is to concentrate the M inputs into a serial output or to again provide the output time division (T.D.) bus 17 for connection to other similar chips or for further data routing. Power for the demultiplexer 20, the logic array 21 and the multiplexer 22 is obtained from the common power terminal 14 with ground obtained from terminal 15.

Essentially, devices as demultiplexer 20 and multiplexer 22 operate with counters or registers and gate circuitry which sequentially sample the input data bus as bus 16 or input data lines as inputs M to provide separation of such signals and hence in order to provide proper synchronization and operation a suitable clock or control signal as applied to terminal 18 can be used. In any event, it is also understood that the chip may include an internal clock which is stable for system purposes and hence one my elminate terminal 18.

It is also understood that the input and output busses could be 4 bit parallel, 8 bit parallel or other parallel arrangements depending upon system requirements and considerations. In a similar manner each device 10 could have more than one input and output bus.

Thus a device having a configuration as shown in FIG. 1 is employed to reduce the number of pads or input and output terminal pins associated with present ULA devices or general purpose devices. This will eliminate many of the problems described above in regard to backplane wiring, connector size and wiring, package structure and so on. The device 10 of FIG. 1 is thus employed to reduce terminal or pin count by employing time division input and output busses interfacing respectively with a demultiplexer, a logic array and a multiplexer. The device for the sake of convenience will be referred to as a Reduced Terminal Array Chip (RTAC).

While device 10 has been described as a single chip it could be constructed using separate chips on a single printed circuit board.

A further advantage of the technique is to allow the very high clock rates now attainable with VLSI and GaAs devices to minimize logic processing delays and to permit software control of combinational logic functions via a separate time multiplexed instruction register 98 and input terminal 100 connected to a logic instruction input bus.

Figure 2:
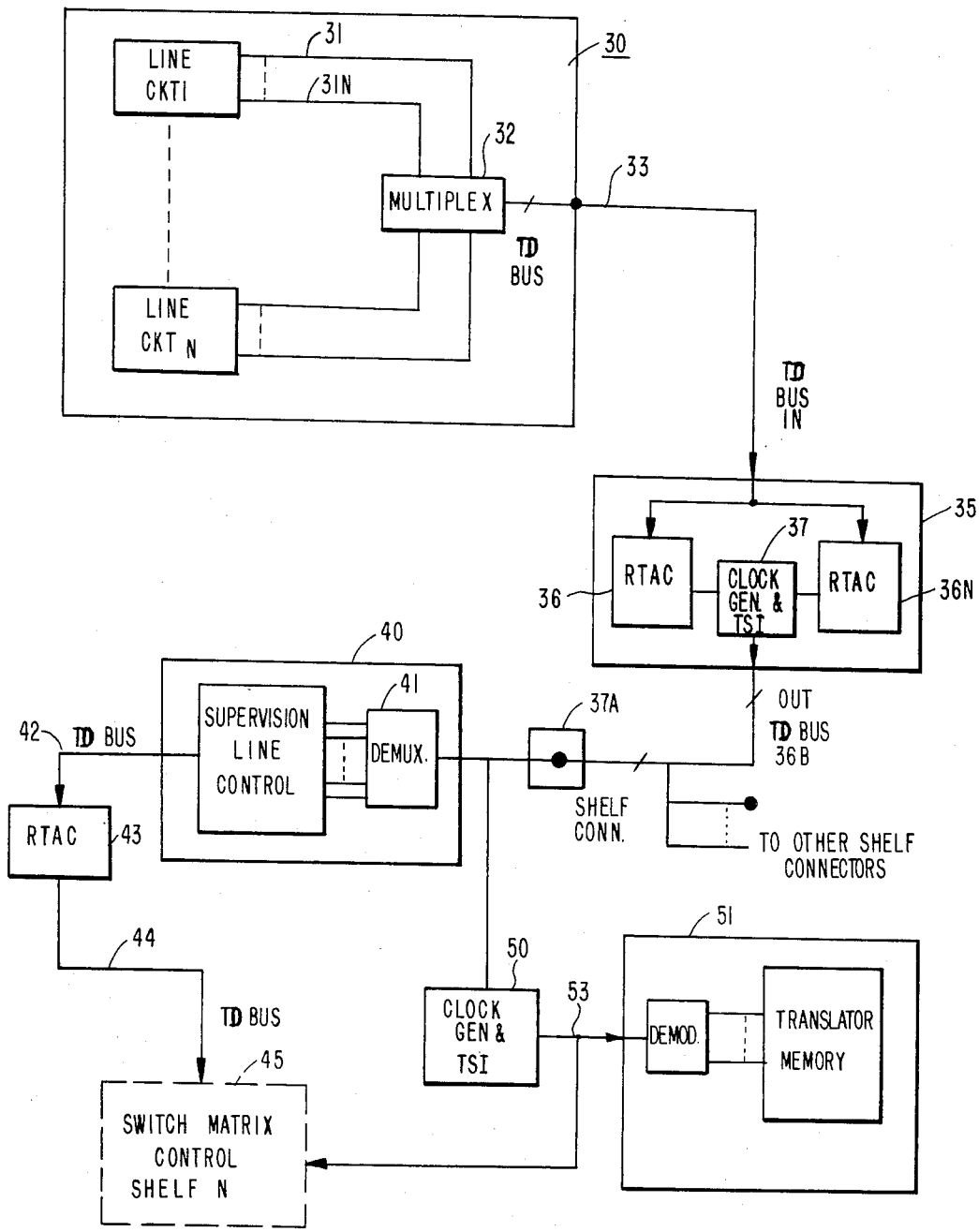
FIG. 2 is a block diagram showing the use of the apparatus of FIG. 1 in a digital switching system.

Referring to FIG. 2, there is shown a simple block diagram of portions of a digital communications system such as the ITT 1240 employing the RTAC devices to reduce wiring and so on.

As indicated such systems employ line circuits for each subscriber associated with the system. Reference numeral 30 refers to a line circuit board. The board or card 30 may contain the necessary circuitry for a plurality of subscriber lines as 1 to N. Hence the system is associated with vast quantities of such cards as 30 to accommodate a large number of subscribers as subscriber lines, trunks and so on. Each line circuit may be associated with a plurality of output and input leads as 31 to 31N necessary for switching operation. Hence the system requires that the states of the line circuit as to busy and idle be known, the address of the line circuit, the position of the line circuit in relation to the switching network or matrix, supervision as to ringing or busy tone and so on. These characteristics and control of such line circuits are well known and have been extensively described in the literature as well as the implementation of such line circuits in the switching system. See for example U.S. Pat. No. 4,201,889 entitled Distributed Control Switching System by A. J. Lawrence et al issued on May 6, 1980 and assigned to the assignee herein. See also U.S. Pat. No. 4,317,962 entitled Distributed Control for Digital Switching System et al issued on Mar. 2, 1982 to J. E. Cox and assigned to the assignee herein.

Such patents relate to the general layout and particulars of modern switching systems as the ITT 1240. Other patents as U.S. Pat. No. 4,161,633 entitled Subscriber Line/Trunk Circuit issued on July 17, 1979 to R. Treiber, and U.S. Pat. No. 4,254,305 entitled Current Limited Subscriber Line Feed Circuit issued on Mar. 3, 1981 to R. Treiber show examples of line circuits and depict various interface connections and so on with the switching network or central office.

As one can ascertain from FIG. 2, each line circuit module as existing on circuit board 30 may be associated with many leads. These leads are brought to connectors on the backplane of the rack or elsewhere and wired and cabled to the appropriate locations in the system. Hence the card 30 is really limited by the number of pins or terminals that can be accommodated and the cost of wiring the cards 30 into the system is considerable as explained above. According to the teachings of this invention, the line circuit leads as 31 to 31N are directed to the input of a multiplexer 32. The multiplexer provides at its output a serial signal which signal constitutes the time division input bus as bus 16 of FIG. 1. As indicated, this may be a single serial bus or a 4-bit, 8-bit and so on parallel bus. The bus 33 is directed to the input terminal (12 of FIG. 1) of an RTAC module 35. The module 35 may contain a number of RTAC devices as 36 to 36N with the common input bus 33 directed to the input of each RTAC as 36 to 36N. The output buses are connected to module 37 which is a clock generator and time slot interchanger (TSI). Time slot interchangers are also well known devices and have been extensively described in the literature. The clock generator and TSI 37 controls the RTAC's such that the input demultiplexer and output multipler as 20 and 22 of FIG. 1 are synchronized with respect to each other and with respect to the logic performed by the logic array circuits 21 of the RTAC's. For example, the RTAC 36 is designed such that the logic array 21 will perform logic operations on line circuit bits as may be necessary for other system modules. This alleviates the burden on these modules and can, therefore, further reduce component count and wiring requirements. Hence the logic array can perform logic operations necessary for switchboard interfacing prior to directing the bits to other modules. The TSI 37 is a device which can be programmed or wired to interchange time slots for given logic bits, either directly on the module 35 or to leave the module 35 as to a backplane module. Thus the backplane is treated like a module having a time division input and output bus to pass logic signals and to also leave the backplane (shelf) on a time domain basis to go to other shelves.

The module 35 provides an output time division bus 36B via terminal 13 of FIG. 1. This time division bus is a serial data bus which may also be a 4, 8 or other bit parallel bus and is directed to a shelf connector 37A. As one can understand, in prior systems each separate wire as 31 to 31N of the line circuits on card 30 would have to be separately directed to the connector 37A. Thus the output bus 36B is now directed to a supervision and line control module 40. The module 40 may include a demultiplexer 41 (similar to 20 of FIG. 1) to then direct the appropriate bits to supervision and line control circuitry for specifying ringing, busy and other tones as well as line supervision and so on. The outputs of the module 40 may also be transformed into a serial data signal to provide another time division bus 42 connected to an associated RTAC 43 for providing a TD output bus 44 for application to other system modules such as the switch matrix control 45 which module may be associated with another backplane system shelf N. RTAC 43 may have internal logic in circuit 21 for processing the data from module 40.

In a similar manner the time division bus 36 as directed from the shelf connector 37 is coupled to the input of a clock generator and TSI module 50. The module 50 operates to reshape and resynchronize the data on bus 36B as well as performing bit interchange if necessary for transmitting the data via the TD bus 53 to other system modules as the translator and memory module 51 and so on. Thus as one can now visualize, the use of RTAC substantially reduces the wiring and pin or terminal requirements of the entire system.

The fact that each RTAC contains its own logic array or finite state machine circuitry enables the RTAC device to perform logic operations on data before transmission over the output time division bus. Hence this fact further alleviates the burden on other system modules. As with the RTAC devices, a number of variations are possible with the TDM buses associated with the shelves, which buses can also be special buses or parallel buses as necessary to suit the traffic load.

Essentially, the concepts and structure described enables one to repartition the system logic. In this manner, logic items requiring fast system response can be handled by the RTAC to thereby compensate for the delays afforded by passing the signals between shelves or between the different cards associated with the system modules. Thus with advances in VLSI technology allowing gigabit rates, the techniques described can be employed to trade time for pin or terminal complexity in the packages and the associated complexity of the printed circuit cards and the backplane connections. Hence the very high speed logic can be used to make a practical cost savings in comparatively slow speed equipment such as telephone switching and communications equipment.

Figure 3:
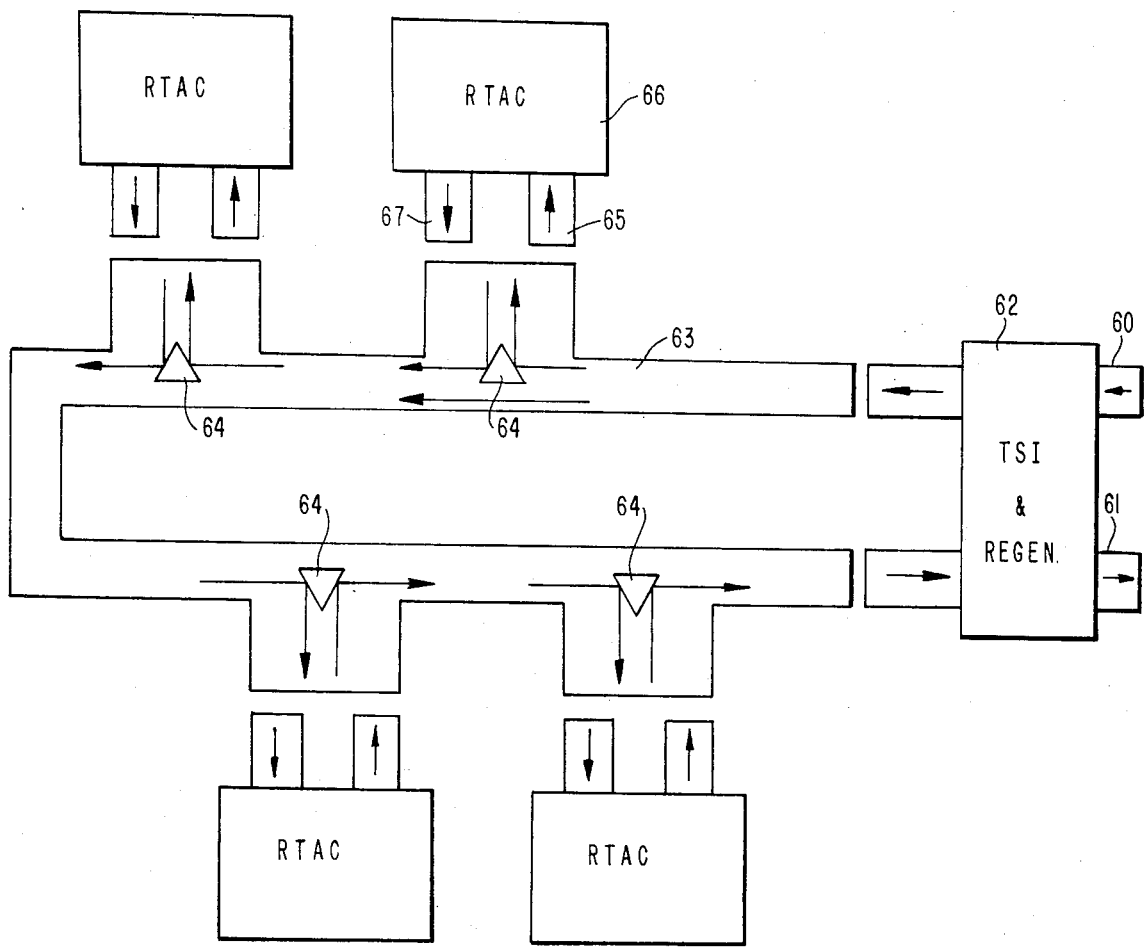
FIG. 3 is a block diagram depicting the use of reduced terminal array card apparatus employed in an optical environment.

Referring to FIG. 3, threre is shown a simplified block diagram of the above concept employed with fiber optics communications. It is known that fiber optic systems are widely employed in the communication field and essentially a fiber optic cable can transmit digital data along the cable length in the same manner as the TD buses above described.

As seen in FIG. 3, a switching system backplane is terminated in an input cable 60 and an output cable 61. An optical analog of the input signal on the TD bus 16 of FIG. 1 is impressed upon the fiber cable termination 60 by conventional optical coupling techniques. Such techniques for converting electrical signals into optical signals are well known. See a text entitled *Optical Communications* by R. M. Gagliardi et al published in 1976 by John Wiley & Sons, Inc. See also *Reference Data for Radio Engineers* published in 1977 by Howard Sams & Co. (ITT).

The input backplane signal applied to fiber cable 60 enters a TSI and optical regenerator module 62 where the signal is regenerated as it is shaped and where time slot interchange may be performed. The time division optical signal is then directed to other switch modules via the fiber bus 63. The optical signal impinges upon a partial prism 64 where it is reflected into an RTAC device 66 (as 10 of FIG. 1). The optical signal is connected to an electrical signal by conventional means and applied to the input terminal of the RTAC, where it is demultiplexed, and logic performed by the associated array and then multiplexed and applied to the output terminal for conversion back to an optical signal at output port 67. In this manner various system devices along the fiber optic bus 63 will receive the optical signal for use in the manner depicted in FIG. 2. The use of optics brings the well known immunity to electrical noise into the card and backplane level and may also help with making the equipment resistant to electromagnetic impluses. It is, of course, understood that more than one fiber may be used to circulate the data in a time division mode. It is also clear that the optical taps as the ports 65 and 67 may be multiple T type ports for further distribution of each of the output TD bus signals to other system devices.

As an alternative to the use of the prisms 64, liquid crystal couplers as disclosed in U.S. Pat. No. 4,385,799 may be used.

Thus whether one employs VSLI interfaces in terms of conventional electrical reception and transmission circuits or optical interfaces, the techniques described serve to eliminate the attendant problems with backplane wiring, pin count and in general the many problems associated with the coupling of vast numbers of data pins and terminals throughout a system.

It is therefore apparent that the structure and techniques described are cognizant of the fact that an optimum means of reducing large system cost resides in the simplication of the packaging technology.

What is claimed is:

1. Circuit apparatus for performing operations on data in a digital system and for distributing said data throughout said system, comprising:
   an input for serially receiving digital data signals from an input time division data bus;
   demultiplexing means responsive to said digital data signals for providing at an output a plurality of data outputs, each data output indicative of one of said digital data signals;
   data operating means having a plurality of inputs and outputs, said inputs being associated with said plurality of data outputs for performing operations on said data signals and for providing a plurality of output digital data signals at said outputs for distribution throughout said system;
   multiplexing means, having a plurality of inputs adapted to receive said output digital signals of said data operating means, for serially providing said output digital data signals;
   a time slot interchanger coupled to said multiplexing means for varying the positions of said output digital data signals in said serially provided output digital data signals; and
   an output for serially providing said output digital data signals to an output time division data bus, whereby said circuit requires a reduced number of terminals as compared to the inputs and outputs of the data operating means.

2. The circuit apparatus according to claim 1, wherein said demultiplexing means, said data operating means and said multiplexing means are included in a single integrated circuit, said integrated circuit including at least one input terminal for coupling to said input time division data bus, an output terminal for coupling to said output time division data bus, a power terminal adapted to be coupled to a source of power, and a referenced terminal adapted to be coupled to a point of reference potential.

3. The apparatus according to claim 1 wherein said input time division data bus is a fiber optic cable.

4. The apparatus according to claim 1 further including clock generator means coupled to said demultiplexing, data operating and multiplexing means to provide clock signals thereto.

5. The apparatus according to claim 1, wherein said digital system is a digital switching system.

6. The apparatus according to claim 1 wherein said output provides a time division signal for coupling to a time division transmission bus.

7. The apparatus according to claim 6, wherein said transmission bus is an optical fiber cable.

8. A method for interconnecting modules in a digital system and for coupling a plurality of digital data signals to various modules within the system, such that the total number of connections required between such modules is substantially less than the number of digital data signals to be coupled, comprising the steps of:
   producing a serial signal having individual digital data signals impressed thereon;
   transmitting said serial signal to at least one of said other modules;
   demultiplexing said serial signal at said one of said other modules to provide said individual digital data signals to said one of said other modules;
   performing selected logic operations on said individual digital data signals to provide a plurality of output data signals;

multiplexing said plurality of output data signals to provide a serial output data signal having said output data signals serially impressed thereon;

selectively interchanging said output data signals in said serial output data signal to provide a serial output signal; and transmitting said serial output signal to another module.

9. The method according to claim 8, wherein said serial output data signal is an optical signal suitable for transmission along an optical fiber.

10. The method according to claim 8, wherein the step of transmitting said output signal includes transmitting said output signal on an optical fiber cable.

11. The method according to claim 8, wherein the step of providing said serial output data signal includes producing a time division serial signal wherein each data signal is included in an associated time slot.

12. The method according to claim 13, wherein said time division data signal is transmitted on a time division data bus.

13. The method according to claim 8, wherein said output serial signal is a time division serial signal with each of said output data signals included in an associated time slot.

14. The method according to claim 13, further comprising the steps of selectively interchanging the time slots of the output data signals.

* * * * *